United States Patent [19]

Herman

[11] Patent Number: 5,748,280
[45] Date of Patent: May 5, 1998

[54] RIMLESS EYEGLASSES HAVING A SINGLE WIRE BRIDGE AND REMOVABLE LENSES

[75] Inventor: Pat Herman, Aptos, Calif.

[73] Assignee: Eyes For You Inc., Aptos, Calif.

[21] Appl. No.: 724,500

[22] Filed: Sep. 30, 1996

[51] Int. Cl.$^6$ ............................... G02C 1/02; G02C 5/14
[52] U.S. Cl. ..................... 351/110; 351/106; 351/116; 351/135; 351/138
[58] Field of Search ..................... 351/41, 106, 110, 351/111, 113, 116, 121, 124, 133, 134, 135, 138, 140, 151, 152; 2/441, 443

[56] References Cited

U.S. PATENT DOCUMENTS

| | | | |
|---|---|---|---|
| 5,110,197 | 5/1992 | Arad | 351/41 |
| 5,135,296 | 8/1992 | Lindberg et al. | 351/106 |
| 5,297,298 | 3/1994 | Salatka et al. | 2/452 |

FOREIGN PATENT DOCUMENTS

| | | |
|---|---|---|
| N62079 | 10/1951 | France . |
| 1087904 | 8/1953 | France . |

*Primary Examiner*—Huy Mai
*Attorney, Agent, or Firm*—Carr & Ferrell

[57] ABSTRACT

Rimless eyeglasses having removable lenses. Each lens has a pair of bridge securing openings. The bridge is formed from a single wire. The single wire bridge is bent to form two c-shaped sections. Each c-shaped section is threaded through a respective lens, and ends of the bridge are inserted into one opening of the pairs of openings. A friction fitting secures an end of the bridge to a lens. Temples and nose pads are similarly secured to the eyeglasses. Each lens has a pair of openings for securing a temple and a pair of openings for securing a nose pad support. The temple has a c-shaped lens-securing member for engaging a pair of openings. A nose pad is mounted on the c-shaped nose pad support. The c-shaped nose pad support engages a pair of holes in the lens.

21 Claims, 4 Drawing Sheets

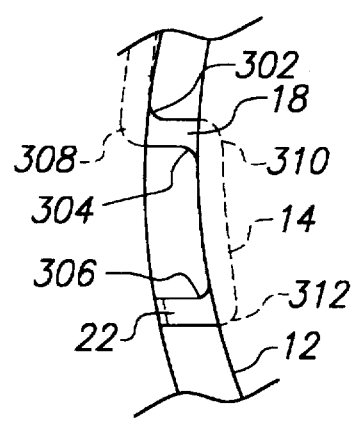
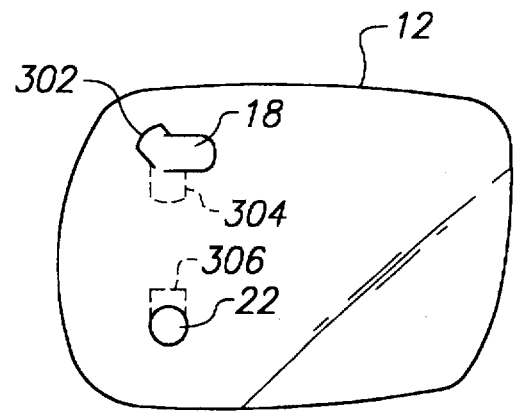
FIG. 10  FIG. 11
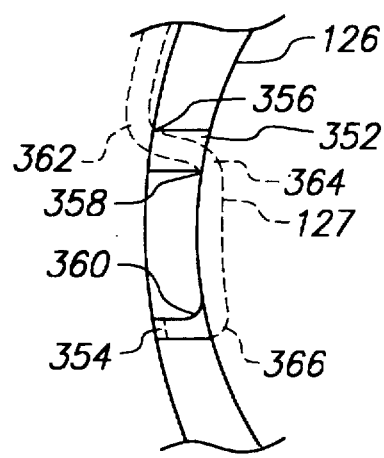
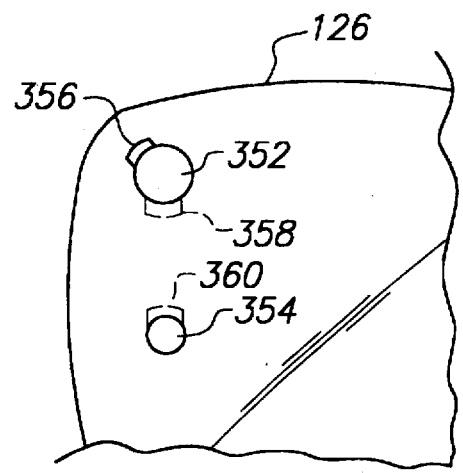
FIG. 12  FIG. 13

RIMLESS EYEGLASSES HAVING A SINGLE WIRE BRIDGE AND REMOVABLE LENSES

BACKGROUND OF THE INVENTION

1. Field of the Invention

The present invention generally relates to rimless eyeglasses, and more particularly to nose pinching style rimless reading eyeglasses and rimless eyeglasses with node pads and temples.

2. Description of Related Art

A large segment of the population is farsighted and requires eyeglasses for reading. As a person ages, the lens of the eye hardens. This condition is called presbyopia and starts around age 35. With presbyopia the lens of the eye focuses behind the retina, thereby producing blurred vision. This problem is easily corrected by the use of magnifying reading eyeglasses.

Because reading eyeglasses are only needed while viewing at close distance, many simply carry their eyeglasses, which presents two problems. First, most eyeglasses are bulky and therefore cumbersome to carry. Eyeglasses take up valuable space in carrying bags and may be too large for pockets.

The second problem, deriving from the first problem, is that the bulk of eyeglasses may discourage people from carrying them, unless it is reasonably foreseeable that the eyeglasses will be needed. Very often presbyopic people that are not carrying their eyeglasses strain to read the menu or the bill at restaurants.

U.S. Pat. No. 5,110,197 to Arad (hereinafter "Arad") describes emergency eyeglasses which consist of a flat plate-shaped body integrally molded around two lenses. Arad's eyeglasses have certain disadvantages even though the design of the flat panel shape makes the glasses compact. First, the permanent mounting of the lenses makes it unfeasible to replace an individual lens. If a person's eyes require different prescriptions, then emergency eyeglasses must be manufactured accordingly. Such a product is not commercially feasible from a manufacturing and distribution perspective. Second, the flat panel that holds the lenses extends well above the eyebrows of the wearer. The size and configuration of the flat panel may reduce the overall field of view of the wearer and may also require the user to hold the eyeglasses with one hand.

OPTI-RAY, Inc., of Farmingdale, N.Y. presently markets pocket size reading glasses. OPTI-RAY's nose-pinching eyeglasses are constructed by connecting the two lenses with a ribbon spring bridge. These eyeglasses present several problems. First the ribbon spring does not permit adjustment of the bridge to fit noses of various sizes. Second, extra lens material is present at inside corners of the lenses to accommodate the molded ribbon spring. The extra material creates a protuberance which is almost as thick as the lenses. This makes the eyeglasses less compact. Finally, since the lenses and the connecting ribbon spring bridge are molded as one piece, OPTI-RAY's eyeglasses present the same problem as Arad. In particular, a set of eyeglasses with the lenses having different optical characteristics must be produced by the manufacturer.

U.S. Pat. No. 5,135,296 to Lindberg et al. (hereinafter "Lindberg") discloses eyeglasses whose temples and bridge are secured to the lenses by pressing a loop of a wire into oblong holes in the lenses. Lindberg simplifies assembly of eyeglasses and replacement of lenses. However, the means for fastening the bridge to the lenses may become unstable if subjected to the pressures that are likely to be exerted on eyeglasses in common use. In particular, the wire loops may become deformed or the oblong holes could become worn, thereby decreasing the stability of the eyeglasses.

In addition to those afflicted with presbyopia, another large segment of the population is nearsighted and requires corrective lenses. Eyeglasses for the nearsighted are typically expensive because they are custom fit to the wearer.

One deficiency with present designs is that if a lens is damaged, the prescription changes, or the eyeglasses are lost, the wearer must wait for an optician to repair or replace the eyeglasses. In some instances, the loss of the eyeglasses may present major inconveniences. For example, if a person is out of town for a business meeting and breaks his/her prescription eyeglasses, important meetings may have to be delayed or canceled.

Therefore, it would be desirable to have eyeglasses which are compact, durable, economical and easily assembled with lenses of different prescriptions and optionally, accommodate nose pads and temples.

SUMMARY OF THE INVENTION

The eyeglasses of the present invention are compact, durable, economical to manufacture and assemble, easily accommodate lenses of different prescription. Optionally, the eyeglasses may have nose pads and temples.

According to the invention, the eyeglasses have two lenses, each with a pair of openings aligned to secure a bridge formed from a single resilient wire. Each end of the bridge forms a generally c-shaped section having an end for insertion into a first opening of the pair of openings. The first opening is designed to secure an end of the wire to the lens.

The second opening of the pair is provided for threading the c-shaped section through the lens. The second opening has a cross-sectional dimension which is large enough to accommodate such threading by hand. The openings in each pair of openings may be aligned either with the nose or the eyebrows of the wearer.

The pairs of openings, each pair having one opening for securing and another opening for threading the wire bridge, in combination with the resilient wire bridge result in flexible, strong and resilient eyeglasses.

According to another aspect of the invention, the lenses each have a channel that connects each opening of the pair of openings. The bridge is bent to conform to the channel, whereby the bridge section between the openings in a lens is recessed in the lens.

In a further aspect of the invention, nose pads are attached to nose pad support members. Each nose pad support member has a c-shaped section and an end to which a nosepad is attached. Similar to the openings for the bridge, pairs of openings are provided to secure the nosepad support members to the lenses.

Temple members may also be added to the eyeglasses. Each of the lenses has a pair of openings for securing a respective temple member, and each of the temple members has mounted thereon a c-shaped lens-securing member. The openings are aligned for engaging the lens-securing member. The manner in which the temple members are attached to the respective lenses is similar to the manner in which the lenses are secured to the bridge.

BRIEF DESCRIPTION OF THE DRAWINGS

FIG. 10 is a cross-sectional view, in the direction of arrow D of FIG. 1, of an embodiment of the openings in a lens;

FIG. 11 is a frontal view of lens 12 which further illustrates the openings of FIG. 10;

FIG. 12 is a cross-sectional view, in the direction of arrow E of FIG. 5, of an embodiment of the openings for securing a bridge to a lens; and FIG. 13 is a frontal view of a lens which further illustrates the openings of FIG. 12.

DETAILED DESCRIPTION

Figure 1:
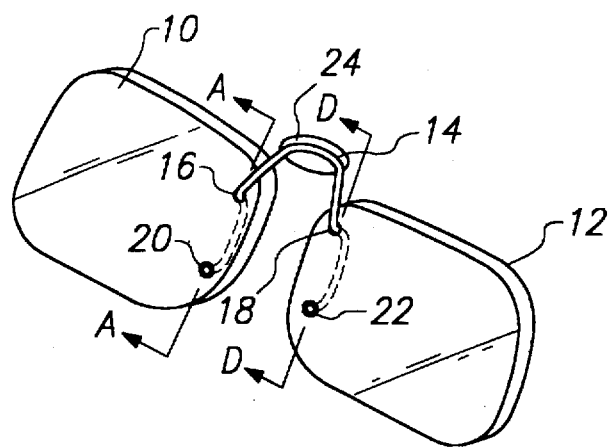
FIG. 1 is perspective view of a first embodiment of the eyeglasses of the present invention.

FIG. 1 is perspective view of a first embodiment of the eyeglasses of the present invention. The eyeglasses are a nose-pinching style and include a first lens 10, a second lens 12, and a bridge 14.

The lenses 10, 12 are manufactured preferably of lens-quality plastic. Plastic is preferred for ease of manufacture and portability. However, those skilled in the art will recognize that other materials which are suitable for lens making may be substituted. Each lens 10, 12 is approximately 1.2" high and approximately 1.6" wide. Those skilled in the art will recognize that the lens size may vary according to the distance between the eyes of the wearer, as well as for styling and manufacturing considerations.

Each of the lenses 10, 12 has a pair of openings. The pairs of openings include top openings 16, 18 and bottom openings 20, 22. The alignment of top opening 16 with bottom opening 20 and of top opening 18 with bottom opening 20 is generally parallel to the adjacent edge of the nose of the wearer of the eyeglasses. The centers of the openings are approximately 0.5" apart and 0.1" from the nearest edge of the respective lens. The distance of a opening from a lens edge may vary according to cosmetic and durability requirements.

The top openings 16, 18 are bored through the lenses 10, 12 and are of a large enough to accommodate threading the bridge 14 through the openings. The bottom openings 20, 22 may, but are not required to, pass through the respective lenses 10, 12.

The bridge 14 is made of a single wire which is preferably stiff and resilient. Common spring wire having a diameter of 0.040" and a length of approximately 2.7" has been used effectively for the non-nose-pinching eyeglasses. For nose-pinching eyeglasses the diameter of the wire is 0.030". Those skilled in the art will recognize that the length of the wire is variable, depending upon the size and thickness of the lenses, the desired distance between the top openings 16, 18 and the bottom openings 20, 22, and the nose size of the wearer.

The bridge 14 is formed to allow insertion of one end of the bridge into the bottom opening 20 and the other end into the bottom opening 22. The bottom openings 20, 22 are approximately the same diameter as the wire that forms the bridge 14 such that the ends of the bridge 14 can be inserted into the respective openings with a moderate amount of force. The friction of the fitting retains the ends of the wire in the openings.

The bridge 14 is further formed to direct the wire upward from the bottom openings 20, 22 to the top openings 16, 18. Bends in the bridge further direct the wire through the top openings to a nose-spanning section 24 which spans the nose of a wearer of the eyeglasses. The angle leading to the nose-spanning section may be varied to fit the nose size of the wearer.

The eyeglasses of FIG. 1 are assembled by first preforming the bridge 14 from the wire. Once the bridge is formed, a lens may be secured to the bridge by threading through top opening 16 an end of the bridge 14 which is to be inserted into bottom opening 20 and the section of the bridge 14 which is to extend from top opening 16 to bottom opening 20. Then a moderate amount of force is applied to the end of the bridge 14 for inserting into bottom opening 20. A similar procedure is followed for lens 12.

The pairs of openings, each pair consisting of a top opening 16, 18 for threading and a bottom opening 20, 22 for securing the bridge 14, in combination with the resilient wire bridge results in eyeglasses that are flexible, compact, and durable. In addition, the lenses 10, 12 are easily removable from the bridge 14 and are therefore easily replaceable. Also, the pressure upon the nose may be varied by adjusting the arc formed by the bridge.

Figure 2:
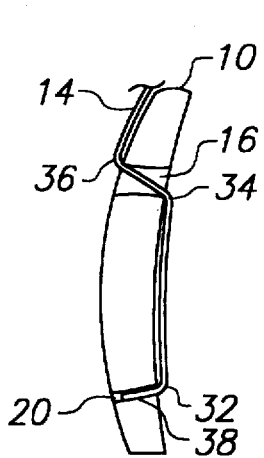
FIG. 2 is a cross-sectional view in the direction of arrows A of the lens and the bridge of FIG. 1.

FIG. 2 is a cross-sectional view in the direction of arrow A in FIG. 1 of the lens and the bridge of FIG. 1. In order to secure the lens 10 to the bridge 14, each leg of the bridge has three bends 32, 34 and 36 of approximately 90°, each formed in a single plane.

The top opening 16 is large enough to allow the bent wire to be threaded there through. This allows the bridge wire 14 to be completely formed before the lenses 10, 12 are attached. The ease of assembly allows a wearer to mix and match lens sizes and prescriptions with various size bridges.

The diameter of the bottom opening 20 is approximately the same diameter as the wire and preferably sized such that a moderate amount of force is required to insert the tip section 38 of the wire. This eliminates the need for solder or threaded parts as a means for securing a bridge to a lens.

Even though the bridge 14 is shown as extending along the back side of the lens 10 from the top opening 16 to the bottom opening 20, it is contemplated that the bridge 14 could alternatively be shaped such that the section which extends between the top opening 16 and the bottom opening 20 follows the contour of the front of the lens 10.

The top openings 16, 18 and bottom openings 20, 22 may vary in shape and angle depending upon design and manufacturing constraints. In another variation, the angle of incidence of the bore of the openings 16, 18 can vary. In particular, relative to the rear of the lens 10 as seen in the cross-section view of FIG. 2, the angles of incidence for the respective bores could be sloped from the horizontal. Using non-perpendicular bores would allow bends 32, 34, 36 to be other than 90°.

Figure 3:
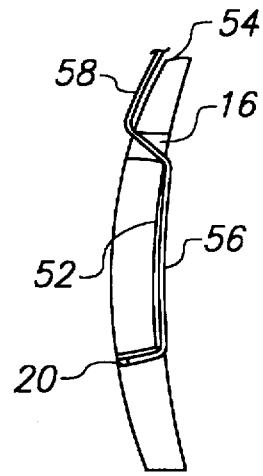
FIG. 3 is a cross-sectional view of an alternate configuration for securing a bridge to a lens.

FIG. 3 is a cross-sectional view of an alternate configuration for securing a bridge to a lens. The distinction between the configurations of FIG. 2 and FIG. 3 is that a channel 52 is formed in the lens 54 of FIG. 3. The section 56 of the bridge 58 extends from the bottom opening 20 to the top opening 16 and is seated in the channel 52. The channel 52 permits the section 56 to be recessed below the surface of the lens 54.

Figure 4:
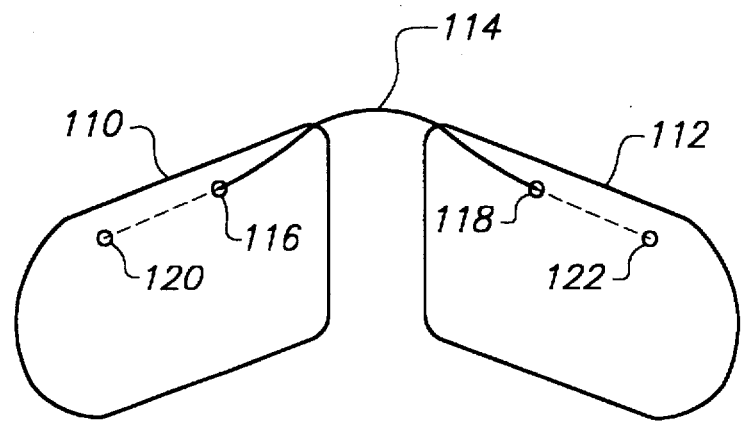
FIG. 4 is a frontal view of a second embodiment of eyeglasses having an alternate placement of openings for securing a bridge.

FIG. 4 is a frontal view of a second embodiment of eyeglasses having an alternate placement of openings for securing a bridge. Each of the lenses 110, 112 has a pair of openings including respective include interior openings 116, 118 and exterior openings 120, 122. The exterior openings 120, 122 may, but are not required to, pass through the respective lenses 110, 112.

The bridge 114 is similar to bridge 14. The bridge 114 is formed to allow insertion of one end of the bridge 114 into exterior opening 120 and the other end into exterior opening 122. The exterior openings 120, 122 are approximately the same size as the wire which forms the bridge 114. The size of the bottom openings 120, 122 is such that the ends of the bridge 14 can be inserted into the respective openings with a moderate amount of force. The friction of the fitting retains the ends of the wire in the respective openings.

The bridge 114 is further formed to direct the wire from the exterior openings 120, 122 to the respective interior openings 116, 118. Bends in the bridge 114 further direct the wire through the interior openings 116, 118 to a section of the bridge 114 which spans the nose of a wearer of the eyeglasses.

As with the bridge of FIG. 1, the length of the wire used to form the bridge may vary according to the size and shape of the lenses 116, 118 and the nose size of the wearer of the eyeglasses.

The eyeglasses of FIG. 4 may be assembled in a manner which is similar to that for assembling the eyeglasses of FIG. 1. For the sake of brevity, the discussion will not be repeated, and the discussion for FIG. 1 may be referenced for further details.

Figure 5:
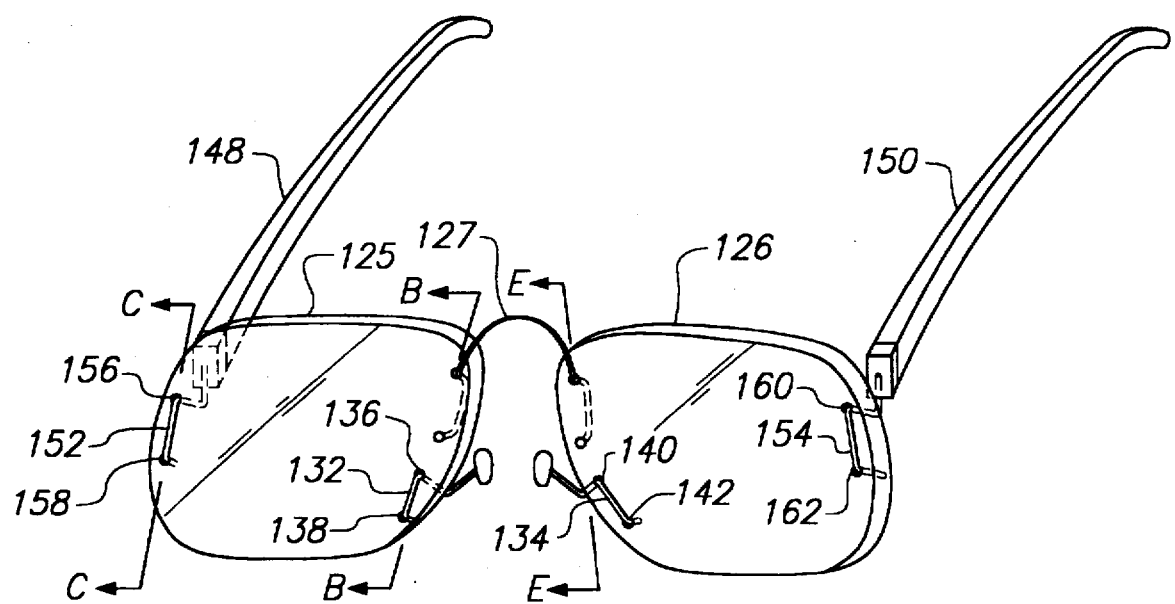
FIG. 5 is perspective view of a second embodiment of the non-nose-pinching eyeglasses of the present invention showing nose pads and temples.

FIG. 5 is perspective view of a second embodiment of the eyeglasses of the present invention. The eyeglasses are a non-nose pinching style and include a first lens 125, a second lens 126, and a bridge 127. In addition, nose pads and temples are included.

Nose pad support members 132, 144 are threaded through pairs of openings 136, 138 and 140, 142 in the respective lenses 10, 12. Nose pads 144, 146 are mounted on the ends of the respected nose pad support members 132, 134. The nose pad support members 132, 134 may be assembled with the lenses 125, 126 in a manner which is similar to that for assembling the eyeglasses of FIG. 1. For brevity, the discussion is not repeated.

Temple members 148, 150 are secured to the respective lenses 125, 126 with apparatus which is similar to the bridge 14 and nose pad support member 132, 134. Lens securing members 152, 154 are attached to the respective temple members 148, 150. The lenses 125, 126 have respective pairs of openings 156, 158 and 160, 162 for receiving the lens securing members 152, 154. The manner in which the temple members 148, 150 are attached to the respective lenses 125, 126 by the lens securing members 152, 154 is similar to that by which the bridge 127 and nose pad support members are attached to the lenses 125, 126.

Figure 6:
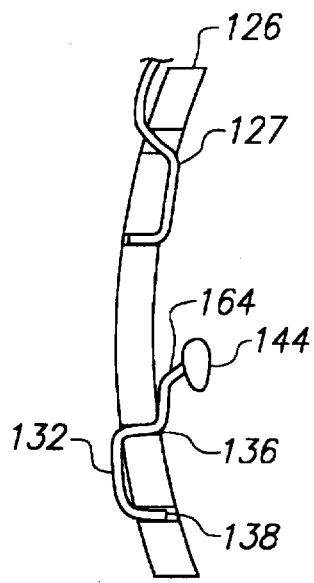
FIG. 6 is a cross-sectional view of a lens with a nose pad support member when viewed in the direction of arrow B of FIG. 5.

FIG. 6 is a cross-sectional view of a lens with a nose pad support member when viewed in the direction of arrow B of FIG. 5. The nose pad support member 132 is attached to the lens 126 in a manner which is similar in which bridge 14 is attached to lens 10.

The nose pad 144 may be formed of conventional material and may include an embedded metal anchor (not shown) which is secured to a post (not shown) The post is attached to the nose pad support member 132. Those skilled in the art will recognize such a post may be secured to the nose pad support member 132 by means of a male-threaded end at end 164 of the nose pad support member and the post having a mated female-threaded end. Alternatively, a post could be secured to the nose pad support member 132 by clamps and machine screws. Those skilled in the art will recognize various other means for securing the nose pad 14 to the nose pad support member 132.

Figure 7:
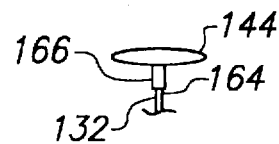
FIG. 7 is a top view of the section of the nose pad support member to which the nose pad is attached.

FIG. 7 is a partial top view of a nose pad support member to which a nose pad is attached. The nose-pad 144 is attached to a post member 166 having a threaded female opening for receiving the threaded male end 164 of the nose pad support member 132.

Figure 8:
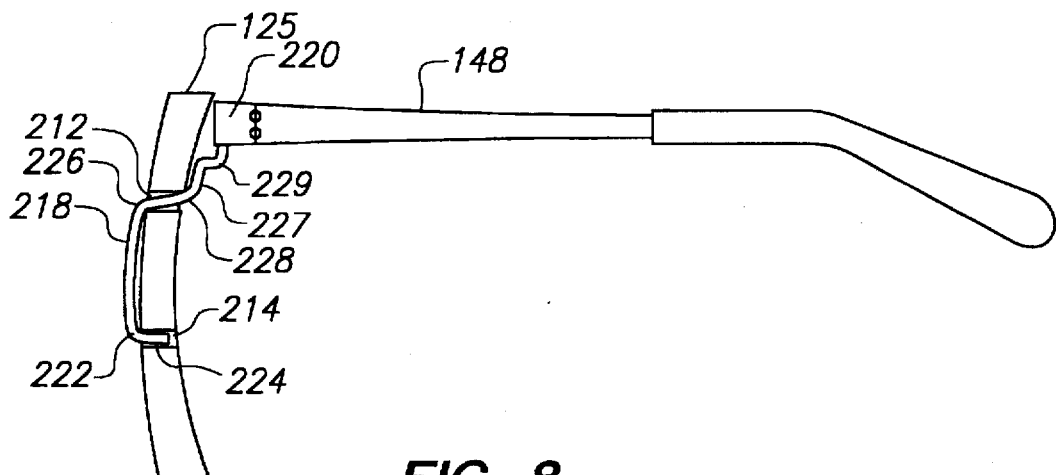
FIG. 8 is cross-sectional view of a lens and temple member as viewed in the direction of arrow C of FIG. 5.

FIG. 8 is cross-sectional view in the direction of arrow C of FIG. 5 of a temple member mounted to a lens. The temple 148 is attached to the lens 125 in a manner which is similar to the way in which nose pad support member 132 is attached to lens 125. Lens 125 has a pair of openings, including a top opening 212 and a bottom opening 214, for securing temple member 148.

The alignment of top opening 212 with bottom opening 214 preferably is generally vertical. The centers of the openings are positioned near an edge of lens 125 which is opposite the edge at which the bridge 14 is secured. The openings 212, 214 are spaced approximately 0.15" from the nearest edge of the lens, and approximately 0.5" apart. The distance of the openings 212, 214 from a lens edge and the distance between the openings may vary according to cosmetic and durability requirements. In addition, as with the various alignments of the bridge openings 16, 20 and 116, 120, the alignment of the temple openings 212, 214 may vary.

The top opening 212 is bored through the lens 125 and is large enough to accommodate insertion of the lens-securing member 218 there through. The bottom opening 214 may, but is not required to, be bored through the lens 125.

The temple member 148 has an attached lens-securing member 218. The lens-securing member 218 is preferably fixedly mounted to the section 220 and made of a spring wire.

The bend 222 on the lens-securing member 218 is approximately 90° and forms a section 224 for insertion into bottom opening 214. The diameter of the bottom opening 214 is preferably of a size that requires a moderate amount of force to insert the section 224. The length of section 224 is approximately 0.10" from its tip to the center line of the lens-securing member 218 section which extends upwardly from the bend 222.

The bends 226, 228 are also approximately 90° and form section 230 of the lens-securing member 218. Section 230 extends through the top opening 212, which is preferably of a size that permits the section 224 along with bend 222 to be inserted there through without deforming the lens-securing member 218. Bends 227 and 229 are approximately 90° and formed to position the lens-securing member 218 to lie flat against the lens 125. All of bends 222, 226, 227, 228, and 229 are formed in the same plane.

The lengths of the sections 224, 230, formed by the bends 222, 226, and 228 are such that section 224 may be inserted into bottom opening 214 and section 230 extends through the lens 125. Section 230 should be long enough to allow the lens-securing member 218 to be inserted through the lens 125, but short enough to accommodate the bends 222, 226, 228 and to conform the vertical sections formed by the bends close to the respective surfaces of the lens.

Figure 9:
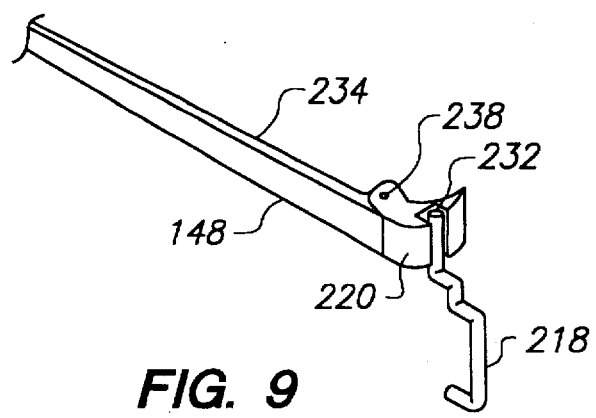
FIG. 9 is frontal perspective view of a right-hand temple member and c-shaped lens-securing member.

FIG. 9 is frontal perspective view of a right-hand temple member and c-shaped lens-securing member. The lens-securing member 218 is permanently mounted to the temple member 148 and set in a channel 232.

The temple member 148 has two hinged parts, a forward hinged part 220 and a rearward hinged part 234. The forward hinged part 220 is wide enough to accommodate the channel 232 with the lens-securing member 218. A hinge pin 238 is shown at the back of the forward hinged part 220.

The forward hinged part 220 is secured to the rearward hinged part 234 with a conventional eyeglass hinge as represented by hinge pin 238. Those skilled in the art will recognize that there are various types of hinges available for constructing a temple member 148 in accordance with the teachings of the present invention.

Eyeglasses having the temple member 148 with a lens-securing member 218, in combination with the lens 10 and bridge 14, are easily assembled.

FIG. 10 is a cross-sectional view, in the direction of arrow D of FIG. 1, of an embodiment of the openings 18, 22 in lens 12. The bridge 14 is illustrated with dashed lines. Opening 18 has beveled edges 302 and 304, and opening 22 has beveled edge 306. The beveled edges accommodate the interior portions of the bridge formed by bends 308, 310, 312 and further allow the bridge 14 to closely conform to the contour of the lens 12.

FIG. 11 is a frontal view of lens 12 which further illustrates the openings 18, 22 of FIG. 10. The shape of the opening 18 is rounded-rectangular The short sides of a regular rectangle have been replaced with semi-circles. The short dimension of the opening 18 is approximately the same dimension as bridge 14. Bevel 302 extends from the upper-left portion of opening 18. Bevel 304 extends toward opening 22, and bevel 306 extends toward opening 18.

The bevels 302, 304, 306 and the rounded-rectangular shape of opening 18 are preferred for the nose-pinching style eyeglasses of FIG. 1.

FIG. 12 is a cross-sectional view, in the direction of arrow E of FIG. 5, of an embodiment of the openings for securing the bridge 127 to lens 126. As with the openings 18, 22 of FIG. 10, the openings 352, 352 have bevels 356, 358, and 360. The beveled edges accommodate the interior portions of the bridge formed by bends 362, 364, 366 and further allow the bridge 127 to closely conform to the contour of the lens 126.

Opening 352 differs from opening 18 in that opening 352 is circular. Opening 352 has a diameter which is larger than the lower opening 354.

The configuration of openings 352 and 354 is generally preferred for eyeglasses which are of the non-nose-pinching style. The configuration of openings 352 and 354 may be used for the temple support members 152, 154 and the nose pad support members 132, 134, as well as for the bridge 127.

FIG. 13 is a frontal view of lens 126 which further illustrates the openings 352, 354 of FIG. 12. Both of openings 352 and 354 are circular. Opening 354 has a larger diameter than that of opening 354 and which allows bridge 127 with bends 362, 364, 366 to be threaded through. Bevel 356 extends from the upper-left portion of opening 352. Bevel 358 extends toward opening 354, and bevel 360 extends from opening 354 toward opening 352.

The bevels 356, 358, 360 and the larger diameter of opening 352 are preferred for the non-nose-pinching style eyeglasses of FIG. 5.

The exemplary embodiments described herein are for purposes of illustration and are not intended to be limiting. Therefore, those skilled in the art will recognize that other embodiments could be practiced without departing from the scope and spirit of the claims set forth below.

I claim:

1. Rimless eyeglasses, comprising:
   a first lens and a second lens, each lens having a pair of openings for securing a bridge, said pair of openings including a first opening and a second opening;
   a wire having a bridge section, a first c-shaped section formed at a first end of said bridge section, and a second c-shaped section formed at a second end of said bridge section, wherein each of said first and second c-shaped sections has an end inserted in said second opening and a section extending through said first opening.

2. The eyeglasses of claim 1, wherein said first opening and said second opening are aligned with an edge of a nose of a wearer of the eyeglasses.

3. The eyeglasses of claim 1, wherein said first opening and said second opening are aligned with an eyebrow of a wearer of the eyeglasses.

4. The eyeglasses of claim 1, wherein each of said first lens and said second lens has a channel which connects said first opening and said second opening to receive a third section of said c-shaped section of said wire, said third section connecting a first section and a second section of said c-shaped section.

5. Rimless eyeglasses, comprising:
   a first lens and a second lens, each lens having a pair of openings for securing a bridge, said pair of openings including a first opening and a second opening;
   a wire having a first lens-securing section for securing said first lens and a second lens-securing section for securing said second lens;
   said first lens-securing section having:
      a first bend formed at one end of the wire leaving a first section for engaging said second opening of said first lens;
      a second section extending from said first bend to said first opening of said first lens;
      a second bend formed at said first opening for allowing said wire to extend through said first lens via said first opening;
      a third section extending from said second bend through said first opening in said first lens; and
      a third bend, formed at an end of said third section opposite said second bend, that directs said wire upwardly;
   a bridge section having an upwardly directed u-bend extending from said third bend to said second lens securing section; and
   said second lens-securing section formed symmetrically to said first lens-securing section relative to said bridge section and engaging said second lens.

6. The eyeglasses of claim 5, wherein said first opening and said second opening are aligned with an edge of a nose of a wearer of the eyeglasses.

7. The eyeglasses of claim 5, wherein said first opening and said second opening are aligned with an eyebrow of a wearer of the eyeglasses.

8. The eyeglasses of claim 5, wherein each of said first lens and said second lens has a channel which connects said first opening and said second opening to recess said second section of said wire.

9. The eyeglasses of claim 5, wherein said second opening has a beveled edge on a portion of said second opening, and said first opening has a beveled edge on a portion of a first side of said first opening and a beveled edge on a portion of a second side of said first opening.

10. A rimless spectacle mounting for securing a pair of lenses, each lens having a pair of openings for securing a bridge, the pair of openings including a first opening and a second opening, the mounting comprising:

a wire having a first lens-securing section for securing a first lens and a second lens-securing section for securing a second lens;

said first lens-securing section having:

a first bend formed at one end of the wire leaving a first section for engaging a second opening of the first lens;

a second section extending from said first bend to a first opening of the first lens;

a second bend formed at the first opening for allowing said wire to extend through the first lens via the first opening;

a third section extending from said second bend through the first opening in the first lens; and a third bend, formed at an end of said third section opposite said second bend, that directs said wire upwardly;

a bridge section having an upwardly directed u-bend extending from said third bend to said second lens securing section; and said second lens-securing section formed symmetrically to said first lens-securing section relative to said bridge section.

11. Rimless eyeglasses, comprising:

a first lens and a second lens, each lens having a first pair of openings for securing a bridge, a second pair of openings for securing a temple member, and a third pair of openings for securing a nose-pad support member, said first pair of openings including a first opening and a second opening, said second pair of openings including a third opening and a fourth opening, and said third pair of openings including a fifth opening and a sixth opening;

a wire having a bridge section, a first c-shaped section formed at a first end of said bridge section, and a second c-shaped section formed at a second end of said bridge section, wherein each of said first and second c-shaped sections has an end inserted in said second opening and a section extending through said first opening;

a first temple member having a lens-securing member for engaging said third and fourth openings of said first lens, said lens-securing member of said first temple member having a c-shaped section threaded through said third opening with an end inserted into said fourth opening and; and a second temple member having a lens-securing member for engaging said third and fourth openings of said second lens, said lens-securing member of said second temple member having a c-shaped section threaded through said third opening with an end inserted into said fourth opening.

12. The eyeglasses of claim 11, further comprising:

a first nose pad support member for engaging said fifth and sixth openings of said first lens, said first nose pad support member having a nose pad and a c-shaped section threaded through said fifth opening with an end inserted in said sixth opening; and a second nose pad support member for engaging said fifth and sixth openings of said second lens, said second nose pad support member having a nose pad and a c-shaped section threaded through said fifth opening with an end inserted in said sixth opening.

13. The eyeglasses of claim 12, wherein said first opening and said second opening are aligned with an edge of a nose of a wearer of the eyeglasses.

14. The eyeglasses of claim 12 wherein said first opening and said second opening are aligned with an eyebrow of a wearer of the eyeglasses.

15. The eyeglasses of claim 12, wherein each of said first lens and said second lens has a channel which connects said first opening and said second opening to receive a third section of said c-shaped section of said wire, said third section extending connecting a first section and a second section of said c-shaped section.

16. The eyeglasses of claim 12, wherein said first, second, third, fourth, fifth, and sixth openings are circular, and said first opening has a diameter large enough for threading said wire having said bends, said third opening has a diameter large enough for threading a respective one of said lens-securing members, and said fifth opening has a diameter large enough to thread a respective one of said nose pad support members.

17. The eyeglasses of claim 16, wherein said second opening has a beveled edge on a portion of said second opening, and said first opening has a beveled edge on a portion of a first side of said first opening and a beveled edge on a portion of a second side of said first opening, said fourth opening has a beveled edge on a portion of said fourth opening, and said third opening has a beveled edge on a portion of a first side of said third opening and a beveled edge on a portion of a second side of said third opening, said sixth opening has a beveled edge on a portion of said sixth opening, and said fifth opening has a beveled edge on a portion of a first side of said fifth opening and a beveled edge on a portion of a second side of said fifth opening.

18. Rimless eyeglasses comprising:

a first lens and a second lens, each lens having a first pair of openings for securing a bridge, a second pair of openings for securing a temple member, and a third pair of openings for securing a nose-pad support member, said first pair of openings including a first opening and a second opening, said second pair of openings including a third opening and a fourth opening, and said third pair of openings including a fifth opening and a sixth opening;

a wire bridge having a first lens-securing section for securing said first lens and a second lens-securing section for securing said second lens, and a bridge section having an upwardly directed u-bend connecting said first and second lens-securing sections, said first lens-securing section having:

a first bend formed at one end of the wire leaving a first section for engaging a said second opening of the first lens;

a second section extending from said first bend to said first opening of the first lens;

a second bend formed at the first opening for allowing said wire to extend through said first lens via said first opening;

a third section extending from said second bend through said first opening in the first lens; and a third bend, formed at an end of said third section opposite said second bend, that directs said wire upwardly; and wherein said second lens-securing section is formed symmetrically to said first lens-securing section relative to said bridge section;

a first temple having a lens-securing section for engaging said third and fourth openings, said lens-securing section of said first temple having:
- a first bend formed at one end of said lens-securing section leaving a first section for engaging said fourth opening of said first lens;
- a second section extending from said first bend to said third opening of said first lens;
- a second bend formed at said third opening for allowing said lens-securing section to extend through said first lens via said third opening;
- a third section extending from said second bend through said third opening in said first lens;

a second temple having a lens-securing section for engaging said third and fourth openings of said second lens, said lens-securing section of said second temple having:
- a first bend formed at one end of said lens-securing section leaving a first section for engaging said fourth opening of said second lens;
- a second section extending upwardly from said first bend to said third opening of said second lens;
- a second bend formed at said third opening for allowing said lens-securing section to extend through said second lens via said third opening; and
- a third section extending from said second bend through said third opening in said second lens, a first nose pad support member for engaging said fifth and sixth openings of said first lens, said first nose pad support member having a nose pad and a c-shaped section threaded through said fifth opening with an end inserted in said sixth opening; and a second nose pad support member for engaging said fifth and sixth openings of said second lens, said second nose pad support member having a nose pad and a c-shaped section threaded through said fifth opening with an end inserted in said sixth opening.

19. The eyeglasses of claim 18 wherein said first opening and said second opening are aligned with an edge of a nose of a wearer of the eyeglasses.

20. The eyeglasses of claim 18, wherein said first opening and said second hold are aligned with an eyebrow of a wearer of the eyeglasses.

21. The eyeglasses of claim 18, wherein each of said first lens and said second lens has a channel which connects said first opening and said second opening to recess said second section of said wire.

* * * * *